(12) United States Patent
Spurgeon (10) Patent No.: US 8,192,040 B2
(45) Date of Patent: Jun. 5, 2012

(54) DECORATING GUITARS (76) Inventor: Stephen L. Spurgeon, Boulder, CO (US)

( * ) Notice: Subject to any disclaimer, the term of this patent is extended or adjusted under 35 U.S.C. 154(b) by 256 days.

(21) Appl. No.: 12/570,872

(22) Filed: Sep. 30, 2009

(65) Prior Publication Data
US 2011/0075395 A1 Mar. 31, 2011

(51) Int. Cl.
*F21V 9/16* (2006.01)
(52) U.S. Cl. .......................... 362/84; 362/806
(58) Field of Classification Search ............ 362/84
See application file for complete search history.

(56) References Cited

U.S. PATENT DOCUMENTS

| | | | |
|---|---|---|---|
| 3,324,755 A | 6/1967 | Canonico et al. | |
| 3,943,815 A | 3/1976 | Gilbert | |
| 3,958,113 A | 5/1976 | Termohlen | |
| 4,236,191 A * | 11/1980 | Martinez | 362/554 |
| 4,253,097 A | 2/1981 | Hochstrate | |
| 4,449,075 A | 5/1984 | D'Onofrio et al. | |
| 4,563,933 A | 1/1986 | Kim | |
| 4,704,941 A * | 11/1987 | Reilly | 84/464 A |
| 4,890,529 A * | 1/1990 | Grant | 84/291 |
| 5,034,847 A | 7/1991 | Brain | |
| 5,098,748 A | 3/1992 | Shimizu | |
| 5,156,885 A | 10/1992 | Budd | |
| 5,268,827 A | 12/1993 | Granneman et al. | |
| 5,339,550 A | 8/1994 | Hoffman | |
| 5,367,806 A | 11/1994 | Hoffman | |
| 5,418,062 A | 5/1995 | Budd | |
| 5,439,705 A | 8/1995 | Budd | |
| 5,471,773 A | 12/1995 | Hoffman | |
| 5,497,572 A | 3/1996 | Hoffman | |
| 5,516,387 A | 5/1996 | Hoffman | |
| 5,533,289 A | 7/1996 | Hoffman | |
| 5,593,782 A | 1/1997 | Budd | |
| D389,172 S | 1/1998 | Wiese | |
| 5,796,025 A | 8/1998 | Haake | |
| 5,908,698 A | 6/1999 | Budd | |
| 6,215,459 B1 | 4/2001 | Reddy et al. | |
| 6,225,544 B1 | 5/2001 | Sciortino | |
| 6,445,128 B1 | 9/2002 | Bush et al. | |
| 6,528,943 B2 | 3/2003 | Coghlan et al. | |
| 6,760,013 B2 | 7/2004 | Willner et al. | |
| 6,776,496 B2 | 8/2004 | Cok | |
| 6,842,321 B2 | 1/2005 | Brohlin | |
| 6,992,462 B1 | 1/2006 | Hussaini et al. | |
| 7,044,857 B1 | 5/2006 | Klitsner et al. | |
| 7,115,810 B2 | 10/2006 | Ambrosino | |
| 7,320,643 B1 | 1/2008 | Brosius et al. | |
| 7,465,870 B1 | 12/2008 | Homan | |
| 7,682,249 B2 | 3/2010 | Winans et al. | |
| 7,789,760 B2 | 9/2010 | Roireau | |

(Continued)

FOREIGN PATENT DOCUMENTS

GB 2437388 A 10/2007

(Continued)

*Primary Examiner* — Evan Dzierzynski
(74) *Attorney, Agent, or Firm* — Blakely, Sokoloff, Taylor & Zafman LLP (57) ABSTRACT

Apparatus and methods to decorate guitars are disclosed. An apparatus of one aspect may include a guitar shaped video game controller having a body and a neck. The apparatus may also include a decoration applied over a front surface of the body. The apparatus may also include a light coupled with the body of the guitar, the light disposed underneath the decoration, the light to transmit visible light through the decoration.

17 Claims, 4 Drawing Sheets

U.S. PATENT DOCUMENTS

| | | |
|---|---|---|
| 2002/0142830 A1 | 10/2002 | Adams |
| 2004/0085267 A1 | 5/2004 | Levine |
| 2005/0052339 A1 | 3/2005 | Sprague |
| 2005/0090311 A1 | 4/2005 | Allitt et al. |
| 2005/0172785 A1 | 8/2005 | Fisher-Robbins et al. |
| 2006/0250695 A1 | 11/2006 | Welch |
| 2007/0021209 A1 | 1/2007 | Hussaini et al. |
| 2007/0163420 A1* | 7/2007 | Reiss et al. ............ 84/329 |
| 2009/0131170 A1* | 5/2009 | Yow et al. ............ 463/37 |
| 2009/0253509 A1 | 10/2009 | Tripp et al. |
| 2010/0304865 A1* | 12/2010 | Picunko et al. ............ 463/37 |

FOREIGN PATENT DOCUMENTS

JP  2007-275464  10/2007

\* cited by examiner

DECORATING GUITARS

RELATED APPLICATIONS

This patent application claims priority from U.S. Provisional Patent Application No. 61/179,631 entitled "DECORATING GUITARS", filed on May 19, 2009, by Stephen L. Spurgeon. U.S. Provisional Patent Application No. 61/179,631 is hereby incorporated herein by reference in its entirety.

BACKGROUND

1. Field

An embodiment of the invention relates to a method and apparatus to decorate articles. In particular, the embodiment relates to a method and apparatus to decorate guitars, such as traditional stringed musical instruments and guitar video game controllers, or parts thereof.

2. Background Information

The ability to apply decorations to guitars may offer a number of potential advantages. One advantage is that the decorations may enhance the appeal and level of personalization of the guitar. A musician or collector may select a guitar with a logo, design, or color photograph that suits her individual preferences. The decoration may thereby increase interest in the guitar and stimulate purchases and playing of guitars.

BRIEF DESCRIPTION OF THE SEVERAL VIEWS OF THE DRAWINGS

The invention may best be understood by referring to the following description and accompanying drawings that are used to illustrate embodiments of the invention. In the drawings.

DETAILED DESCRIPTION

An embodiment of the invention relates to a method and apparatus to apply color graphics, designs, photography, or other decorations to guitars. In the following description, numerous specific details are set forth. However, it is understood that embodiments of the invention may be practiced without these specific details. In other instances, well-known structures and techniques have not been shown in detail in order to avoid obscuring the understanding of this description.

The present inventor has conceived of methods and apparatus to decorate guitars, such as stringed musical instruments or guitar video game controllers, by applying visually appealing decorations to the guitars. The methods and apparatus may be employed to provide sharp, bright, and very colorful images, patterns, and other decorations on the front and/or back of the guitar, producing a very attractive product. The inventor hopes and believes that the methods and apparatus may greatly advance the art of decorating guitars. In addition, the inventor hopes and believes that the decorations may help to simulate and increase interest and participation in purchasing and playing guitars, or other musical instruments or guitar video game controllers for a wide range of consumers.

Figure 1:
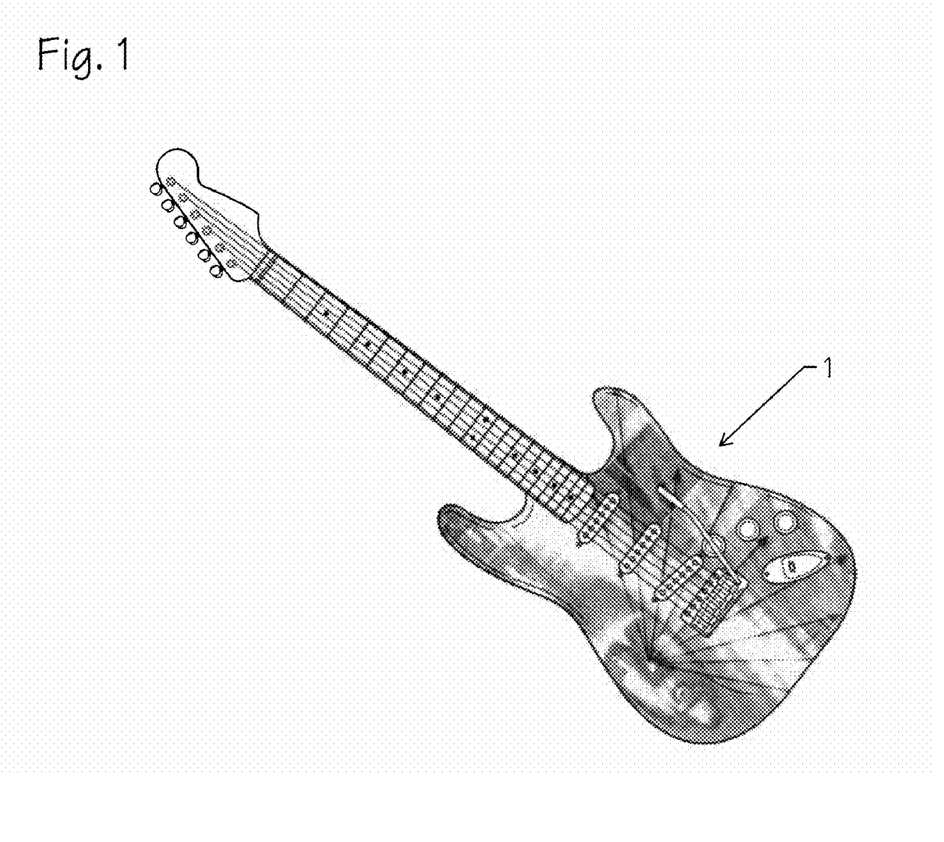
FIG. 1 shows a perspective view of an exemplary guitar decorated in accordance with one embodiment of the invention.

Consider first an exemplary guitar and decoration. FIG. 1 shows a perspective view of an exemplary guitar 1 decorated in accordance with one embodiment of the invention. This particular guitar is a stringed musical instrument. The guitar generally represents a flat-bodied or contoured top stringed musical instrument having a long fretted neck and usually six strings that may be plucked with a pick or with the fingers, for example. The guitar may include either an electric guitar or an acoustical guitar.

As shown, the guitar is adorned with a decoration applied over a surface thereof. In the illustrated embodiment of the invention, the decoration is applied over a surface of a body of the guitar. It is not required that the decoration be applied to the body of the guitar, or only to the body of the guitar. In another embodiment of the invention, other parts of the guitar, such as the neck, and the back, may also optionally be decorated.

The illustrated decoration includes color graphics, which for convenience are represented as grayscale. The color graphics include a photographic quality representation of a digital image. The digital image includes a face and computer-generated graphics (e.g., arrows). It will be appreciated that the particular decoration illustrated is not required. Other suitable decorations may include photographs, graphical arts, logos, words, or the like.

As will be explained in further detail below, in one embodiment of the invention, the decoration may be formed over the surface of the guitar or a part thereof by printing, spraying, or otherwise applying a radiation-sensitive material over the surface and then polymerizing, cross-linking, solidifying, or otherwise curing the radiation-sensitive material over the surface by exposing the material to appropriate actinic radiation. The decoration may include a solid, cross-linked, polymerized, radiation-cured material having inks dispersed therein. The decoration applied tends not to affect the performance of the guitar during play. In one embodiment of the invention, the decoration may be formed over the surface of the guitar by ultraviolet (UV) printing. In this embodiment of the invention, the decoration may include a cross-linked material cured by actinic UV radiation and having the inks dispersed therein.

UV printing may offer a number of potential advantages. The decorations applied by UV printing tend to be durable, high quality, and the rapid printing speeds tend to lend the process to mass production. The UV printing process also tends to work well on wood, plastics, and on polymers of the type often used to coat guitars. In addition, the UV printing process generally employs low or no levels of solvents, which tends to lessen the environmental impact, solvent emissions, and occupational health risks associated with inhalation of vapors.

Due at least in part to the polymerization, the decoration tends to be quite durable. However, an optional coating may often be formed over the decoration in order to help protect the decoration from wear, and enhance the gloss, sheen, and other visual attributes of the guitar. The coating is often referred to in the arts as a topcoat. Commonly employed topcoats include polyurethane coatings and lacquer coatings, such as shellac coatings and nitrocellulose coatings. The addition of the cross-linking, protective coatings may make the decoration more durable, so as to withstand years of use and retain its beauty. Also, the guitar may be cleaned repeatedly without removing or scratching the decoration.

Now, consider an exemplary method of forming the decoration over the surface of the guitar or part thereof (e.g., a body). A method of decorating at least a portion of a guitar, according to one embodiment of the invention, may include providing at least a portion of a guitar, for example a guitar part (e.g., a body) having a surface, and applying a decoration over the surface by spraying a radiation-sensitive ink composition or light-activated ink over the surface with one or more ink-jet spray nozzles or printheads and exposing the radiation-sensitive ink composition to radiation or light.

In providing the portion of the guitar, in one embodiment of the invention, a conventionally produced portion of a guitar, such as a guitar body or a guitar neck, may be provided. In one aspect, the portion of the guitar may include a carved or otherwise machined, and optionally sanded, wood guitar body or neck. Exemplary woods conventionally used in the manufacture of guitars include, but are not limited to, alder, poplar, mahogany, and maple. The use of wood in the manufacture of guitars is prevalent, although the invention is not so limited. In another aspect, the portion of the guitar may include a molded or otherwise formed, and optionally sanded, plastic guitar body or neck. Other materials and conventional portions of the guitars may also optionally be employed.

According to another embodiment of the invention, a hardened curable material or other hard material may optionally be sanded or otherwise roughened. The roughening of the surface may tend to improve adhesion of the decoration. In one embodiment of the invention, the surface may be roughened with 280 to 400 grain sand paper, or the equivalent, to provide good adhesion.

According to yet another embodiment of the invention, the decoration may be formed directly on a UV print primer coating. A suitable UV print primer coating is the 51209B print primer available from Northwest Coatings, of Oak Creek, Wis. The 51209B print primer includes a mixture of acrylate monomers and oligomers having a boiling point of greater than 200° C. and a vapor pressure of less than 1 mm Hg at 25° C. Other UV print primers may also optionally be employed. A coating of the UV print primer may be formed over the surface of the guitar. In one aspect, the primer may be sprayed over the wood surface of the guitar, or over a polyurethane coated, lacquer coated, or otherwise coated surface of the guitar. Painting, roll-coating, dip coating, and other methods of application may also optionally be employed. Printing the decoration directly on the UV print primer coating may tend to enhance the printing and adhesion of the decoration.

Figure 2A:
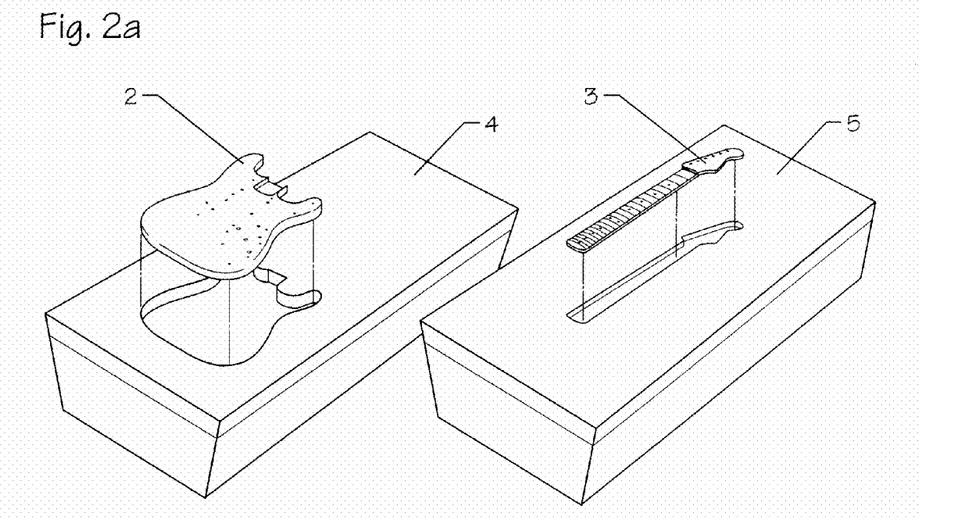
FIG. 2 shows a perspective view of form or mold carriers having cavities, according to one embodiment of the invention.
Figure 2B:
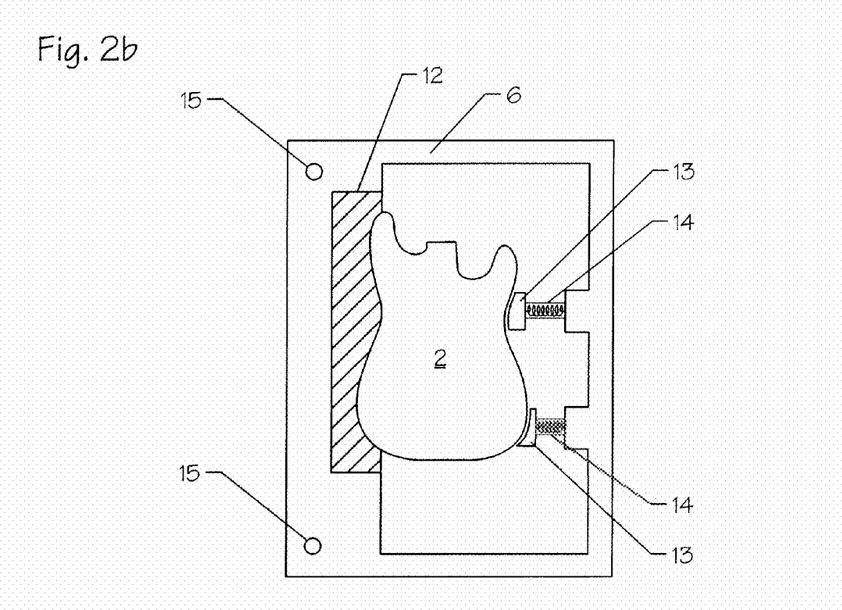
Figure 3:
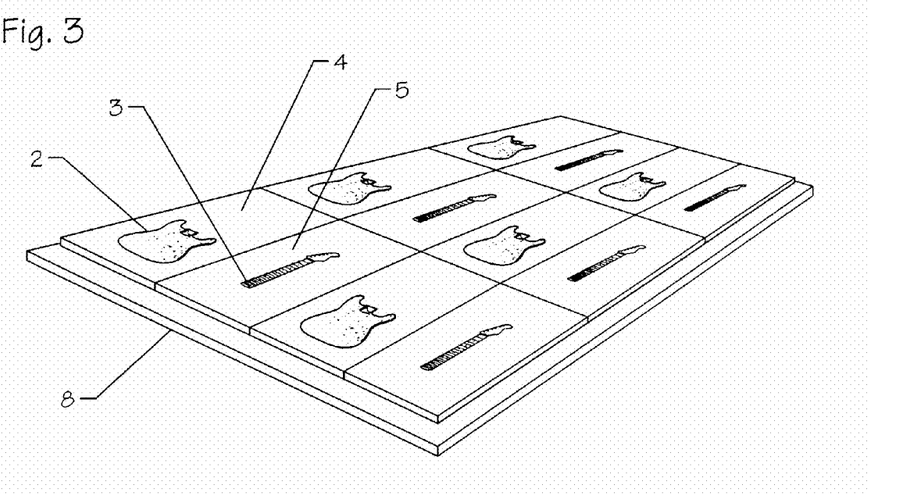
FIG. 3 shows a perspective view of a print-bed, a plurality of standardized carriers on the bed, and body and neck parts of guitars in the carriers, according to one embodiment of the invention.
Figure 4:
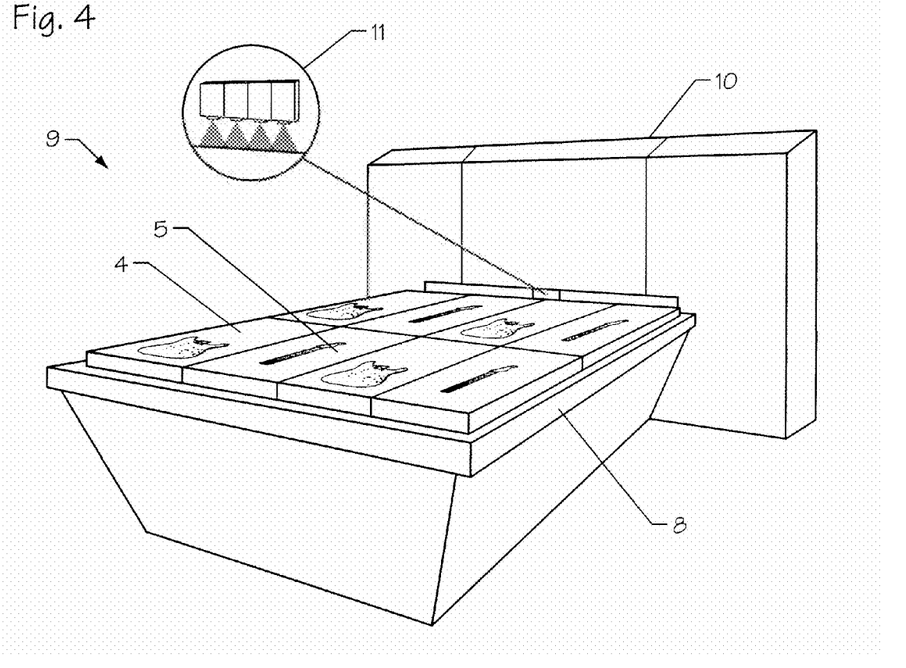
FIG. 4 shows a perspective view of a guitar decorating apparatus, according to one embodiment of the invention.

FIGS. 2-4 show an approach, according to one embodiment of the invention, for holding guitar parts in carriers, supporting the carriers on a print-bed, and printing on the guitar parts with an ink-jet printing apparatus. This is only one contemplated approach and this approach is not required. In the following, first the carriers will be described, then the print-bed and the placement of the carriers on the print-bed will be described, then the ink-jet portion and printing process will be described.

FIG. 2 show perspective views of carriers, according to different embodiments of the invention. The carriers may be used to receive and hold guitar parts, such as bodies and necks. The guitar parts may be placed or positioned in the carriers prior to forming the decoration over their surfaces. The guitar parts often have irregular surfaces and rounded edges. The carriers may tend to facilitate handling the guitar parts and aligning and orienting them with respect to the apparatus in order that the decoration is properly aligned and oriented on the guitar.

FIG. 2 shows a perspective view of forms or molds 4, 5 that include cavities to accommodate guitar elements or parts 2, 3 having varying shapes and sizes, according to one embodiment of the invention. A first form 4 (on the left) includes a cavity having a size and shape corresponding to a body 2 of a guitar to receive the body. A second form 5 (on the right) includes a cavity having a size and shape corresponding to a neck 3 of a guitar to receive the neck. The parts may have a thickness of a guitar, which is often between about ⅛" and 6" in thickness, and may have a solid or open-cavity wood body, depending on the particular type of guitar. The parts may include of various materials, such as plastic, metal, and especially wood. As shown, the cavities may be defined such that planes of the body or neck of the guitar may be generally aligned or coplanar with the top surface of the forms. In one aspect, the cavities may extend through an entire thickness of the forms so that the forms may be flipped over and printing may be performed on the backside of the guitar without removing the part from the form. Many alternate embodiments are also contemplated. For example, in a first alternate embodiment of the invention, a single form may include cavities for both a body and a neck of a single guitar. As another example, in a second alternate embodiment of the invention, a single form may include cavities for two or more bodies or two or more necks. The forms may be made of a variety of materials including, but not limited to, aluminum, wood, and plastic.

In one aspect, the carriers may be standard-sized carriers, for example standard-sized forms or frames. The standard-sized carriers may have one or more standard exterior dimensions. In one aspect, the dimension may be sufficient to accommodate the smallest to the largest article or part of a guitar. For example, the forms may have a width sufficient to accommodate a width of a guitar body and a length sufficient to accommodate a length of a guitar neck. Alternatively, the length may be sufficient to accommodate a length of an assembled guitar. In one aspect, a first standard-sized carrier for a body may have substantially the same size and shape as a second standard-sized carrier for a neck. This may tend to allow a plurality of the standard-sized carriers to be arranged in a substantially reticulated or grid-like arrangement on a print-bed or conveyor (or other electronically controlled moving bed), for example.

FIG. 3 shows a perspective view of a print-bed 8, a plurality of standardized carriers 4, 5 on the bed, and body 2 and neck 3 parts of guitars in the carriers, according to one embodiment of the invention. In the particular embodiment illustrated, the carriers include forms having cavities as shown in FIG. 2a, although frames may also be employed.

As shown, the carriers may be arranged in a substantially reticulated or grid-like arrangement on a surface of the print bed. In the illustrated embodiment, the bodies and the necks of a guitar may be arranged adjacent to one another. Also, in the illustrated embodiment, the bodies are arranged in a line relative to the print bed, and the necks are likewise arranged in a line. In the illustrated embodiment, two lines of bodies and two lines of necks are shown. It will be appreciated that this particular arrangement of carriers is not required. The standardized carriers may be interchangeable in position on the bed. For example, in another embodiment of the invention, there may be only two lines of adjacent carriers, and both lines of carriers may hold guitar body parts.

Often, it may be appropriate to secure or attach the carriers in proper position on the bed so that they do not move around. This may be accomplished in a variety of ways. In one aspect, since the carriers have standardized shapes, a carrier or a predefined plurality of carriers may fit within predefined confines of the bed. For example, the bed may have a frame, edge, ledge, or divider to provide a confine or cavity for one or more carriers. The print-bed may include a cavity that is sized to closely receive therein one or more standard-sized forms or carriers. In one aspect, the bed may have a plurality of such confines to define the substantially reticulated or grid-like arrangement of the carriers. In another aspect, the bed and/or the carriers may have fasteners to provide the attachment and potentially the substantially reticulated or grid-like arrangement. For example, the bed and/or the carriers may have clamps, clips, pins, bolts, screws, magnets, or other fasteners. In one particular example, the bed may have a plurality of regularly-spaced, rigid pins and the carriers may each have at least one corresponding pin hole to mate with a rigid pin by way of pin registration in which the hole of the carrier is inserted over the pin in order to hold the carrier in precise position. In yet another aspect, the carriers may simply be arranged manually in the appropriate arrangement and monitored or placed on a sheet of paper having an outline of a guitar part to help align or register the guitar part.

FIG. 4 shows a perspective view of a guitar decorating apparatus 9, according to one embodiment of the invention. The apparatus 9 includes a jet-printing device 10; a plurality of ink-jet spray nozzles or other printheads 11 of the jet printing device; a plurality of standard-sized forms 4, 5 (other carriers may also optionally be employed), each of the standard sized forms having a standard exterior dimension to accommodate a largest guitar part; a cavity of each of the plurality of standard-sized forms, each of the cavities having a shape of a guitar part; a bed 8 to receive the plurality of standard-sized forms; an integrated digital graphics computer interface (not shown), the integrated digital graphics computer interface to cause the plurality of ink-jet spray nozzles 11 to spray a decoration onto a guitar part positioned in a cavity of a form; and a light (not shown) to apply light to the guitar part. In the illustrated apparatus, the guitar parts are shown as part of the apparatus, although this is not required, and in another embodiment of the invention, an apparatus may omit the guitar parts. The carriers and the apparatus are capable of holding and decorating guitar bodies and the like of various shapes and thickness. The carriers may accommodate the guitar parts and shapes using, in one aspect, a pre-designed set of molds which are formed in standard sizes to attach to the print bed and which are also customized within their interior to accommodate the sizes and shapes of the various guitar bodies or parts and the like.

The particular apparatus illustrated in FIG. 4 is not required. A guitar decorating apparatus, according to another embodiment of the invention, may include a carrier to hold a portion of a guitar; a surface to support the carrier; one or more jet-spray nozzles or other printheads to spray radiation-sensitive ink on a surface of the portion of the guitar, when the portion of the guitar is held by the carrier, and when the carrier is supported by the surface; and a radiation source to supply radiation to the radiation-sensitive ink on the surface of the portion of the guitar.

In one embodiment of the invention, the apparatus may include a high-speed jet-printing apparatus such as a UV ink-jet printer. A variety of UV ink-jet printers are commercially available from numerous sources. Suitable UV ink-jet printers include, but are not limited to, the Durst Rho 160, available from Durst Dice America, of Rochester, N.Y., the 3M® Printer 2500 UV, available from 3M Commercial Graphics Division, of St. Paul, Minn., the Inca Eagle 44, available from Sericol Imaging, of Kansas City, Kans., the Leggett and Platt Virtu, available from Leggett & Platt Digital Technologies, of Jacksonville Beach, Fla., the Scitex VeeJet, available from Scitex Vision America Inc., of Marietta, Ga., the PressVu UV™ 180/600 EC and PressVu UV™ 180/360 EC, both available from VUTEk, Inc., of Meredith, N.H., and the Zund Uvjet 215, available from ACCI, of Edina, Minn. Another notable printer is the UJF-605C Flatbed UV Inkjet Printer, available from Mimaki Engineering Co., LTD, of Tokyo, Japan.

Prior to printing, a digital image may be loaded into the apparatus. The apparatus may include an integrated digital graphics computer interface. In one aspect, in addition to accessing the digital image, a shape file corresponding to a shape of a guitar or guitar part to be printed on may be accessed. Different files may be provided for different types of guitars, such as Stratocaster, V-shape, or the like. The integrated digital graphics computer interface may rasterize the digital image for the printer. A printer driver may be used for this purpose. Then, the rasterized representation of the digital image may be used by the integrated digital graphics computer interface, or another suitable controller, to control the printing or other application of the decoration on the surface by the ink-jet spray nozzles.

Figure 5:
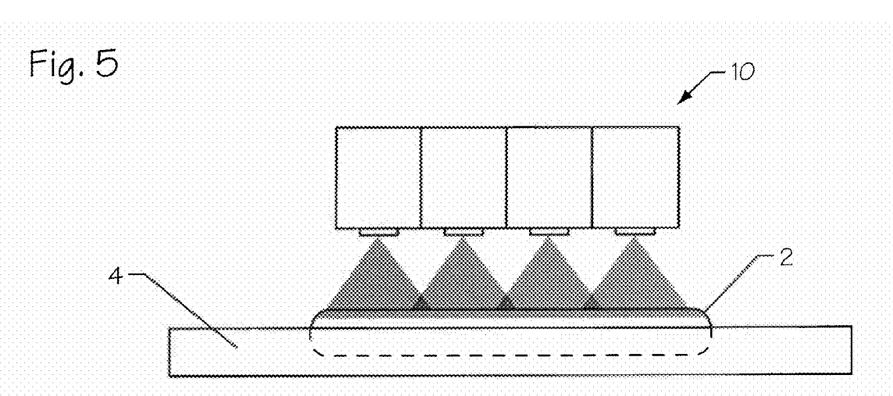
FIG. 5 shows a cross-sectional view of a plurality of ink-jet spray nozzles spraying or otherwise applying a radiation-sensitive ink composition to a surface of a guitar part positioned in a carrier, according to one embodiment of the invention.

FIG. 5 shows a cross-sectional view of a plurality of ink-jet spray nozzles 10 spraying or otherwise applying a radiation-sensitive ink composition over a surface of a guitar part 2 positioned in a carrier, according to one embodiment of the invention. It should be noted that terms such as "over", "top", "bottom", "upper", "lower", "vertical", "horizontal", and the like, are used herein to facilitate the description of the structures as illustrated. It will be evident that the structures may be used in a variety of orientations.

As used herein, the term radiation-sensitive ink composition refers to a composition including ink that is sensitive to radiation and capable of being chemically transformed by the radiation. As used herein, the term ink refers broadly to a colorant and may include inks, dyes, pigment, other colorants (e.g., carbon black), or a combination. In one embodiment of the invention, the radiation-sensitive ink composition may include a UV radiation curable ink composition that is capable of being polymerized, potentially cross-linked, and at least partially solidified by UV radiation. The UV radiation may initiate a polymerization reaction, which may cause polymerization, for example cross-linking, of components in the composition in order to create the solid coating. A heat-activated ink composition may also optionally be employed.

The UV radiation curable ink composition may include one or more monomers, oligomers, inks, and photoinitiators. The monomers often form the bulk of the composition and may be used to adjust the viscosity. In some cases a mixture of monomers, such as monomers capable of giving polyesters and polyacrylates, may be employed. The oligomers often provide properties such as resistance and flexibility to the cured coating. The photoinitiator generally represents a molecule or other species that is sensitive to UV radiation and that is capable of initiating a polymerization reaction when exposed to the UV radiation. The compositions generally contain low levels of solvents or are solvent free. This may offer certain environmental and occupational health advantages, to name a few.

Suitable UV radiation curable ink compositions are commercially available from numerous sources. One suitable composition includes the UV curable ink-jet ink called Uvijet, which is commercially available from Sericol Imaging, of Kansas City, Kans. Other suitable compositions are known in the arts.

In the illustrated embodiment, four nozzles or printheads are shown. In one aspect, the four nozzles may include separate nozzles for cyan, magenta, yellow, and black colored UV ink compositions. These inks are occasionally known in the arts as CMYK inks. In another embodiment of the invention, the plurality of nozzles may include an additional nozzle for white. As will be explained further below, the white may, among other things, be useful for forming a mask layer over which an image may be applied to help mask underlying colors or features of the surface of the guitar and improve image quality. In yet another alternate embodiment, the plurality may include additional nozzles for light magenta and light cyan. The provision of these additional colored UV ink compositions may help to improve image quality. Accordingly, in one example, the plurality may include seven nozzles, for cyan, magenta, yellow, black, white, light magenta, and light cyan. Other color combinations besides those based on CMYK may also optionally be employed.

As shown in FIG. 5, the composition may be sprayed on the surface of the guitar. In spraying the composition on the surface, the distance from the ink-jet spray nozzles or printheads to the surface of the guitar may affect the visual quality of the decoration. The UJF-605C Flatbed UV Inkjet Printer from Mimaki tends to print well when the distance from the ink-jet spray nozzles to the surface being printed on is in the range of from about 1 to 2 inches. In one embodiment of the invention, the commercially available printer may be modified to lower the print-bed so that the distance is in this range when the guitar part optionally held in a carrier is placed on the print bed. Using such a distance is not required, but may help to promote good print quality. Other distances may be appropriate for other printers.

Shortly after the composition is sprayed on the surface, the radiation-sensitive or UV radiation curable ink composition may be exposed to actinic radiation, for example UV radiation or light, to polymerize, cross-link, solidify, and cure the composition on the surface as a durable decoration. The apparatus may include a bulb, lamp, or other radiation source to provide the UV or other radiation. In the UV ink-jet printing arts, the radiation often includes UV radiation having a wavelength in the range of 200 to 400 nanometers (nm). The radiation may promote the polymerization, cross-linking, solidification, and curing process. In one aspect, the UV radiation may decompose the photoinitiators, which may include a number of well-known radiation-sensitive molecules. Then, the decomposed photoinitiators may initiate the polymerization reactions, which create long, often branched, and potentially cross-linked polymeric chains. The polymerization reactions, including the chain lengthening reactions, branching reactions, and cross-linking reactions, generally tend to cause the material to solidify rapidly. Often, depending upon the particular conditions, the material may solidify within a few seconds. Additionally, the approach tends to be economical and tends to be well suited for either small or larger volume manufacturing.

In one embodiment of the invention, the representation of the image may include a dot matrix representation of the image formed by printing with one or more ink-jet spray nozzles. The dot matrix representation of the image may include a pattern of a plurality of dots substantially arranged in a grid. It will be appreciated that the grid may not be perfect. The term substantially arranged in a grid is meant to include at least the amount of deviation from a perfect grid that is customarily expected for a printer of the type used to form the decoration. Each of the plurality of dots may include a solid, polymerized, cross-linked material that may include one or more colored inks.

As the decoration is being applied, the guitar parts may either move under the ink-jet spray nozzles, or the ink-jet spray nozzles may move over the guitar part, as desired. For example, in one aspect, a guitar part may be positioned face-up in a cavity of a form having a shape of the guitar part when the form is in the open position. Then, a shuttle bed, a conveyor belt, or other moving bed having the form thereon may pass under a jet where light-activated ink may be applied to decorate at least a portion of the outer surface of the guitar. Alternatively, in another aspect, a mechanism may be employed to lock the cavity in place and pass the jet over the stationary guitar surface to apply light-activated ink. The printing speed may depend upon the resolution of the digital image. In one embodiment of the invention, when using the UJF-605C Flatbed UV Inkjet Printer of Mimaki, it may be appropriate to employ print speeds of about 200 $ft^2$/hr for 300 dpi, 55 $ft^2$/hr for 600 dpi, and 20 $ft^2$/hr for 1200 dpi.

In one embodiment of the invention, to help increase the quality or appearance of the decoration, a mask may first optionally be printed in a UV curable ink composition over the surface of the guitar, and then a multi-color image may be printed over the mask in one or more UV curable ink compositions. The mask may be applied over the entire surface of the guitar, or selectively over portions of the guitar that are to receive the multi-color decoration, as desired. In one aspect, the mask may have substantially the same size, shape, and position as the image.

The mask may include a convenient, typically solid, background color. For example, the mask may include a substantially white color. The term substantially white is intended to include off-white colors including yellowish or grayish whites (e.g., ivory). One suitable substantially white UV-curable ink is XaarJet-71W00, available from Xaar plc, of Cambridge, United Kingdom. In one aspect, the mask may include a substantially white UV print primer composition. Other colors, such as gray, blue, or black, for example, may also optionally be employed. Other substantially UV curable ink compositions are available from Mimaki, Durst, and Zund, to name a few.

The mask may tend to mask or conceal the underlying surface of the guitar. If the underlying surface of the guitar tends to be difficult to conceal, for example if it is black or another dark color, then two or more masks or a relatively thicker mask may optionally be employed. That is, the thickness of the mask or the number of masks may be based on the darkness of the color of the underlying surface. Likewise, if the underlying color is sufficiently light, the mask may be omitted.

Since the distance from the ink-jet nozzles to the surface of the guitar may influence the print quality, and since the guitars often have irregular surfaces and rounded edges, various approaches are contemplated to help make the distance more uniform over the various regions of the surface of the guitar. In one embodiment of the invention, in order to accommodate for uneven topography of the guitar, the ink-jet nozzles may be capable of moving up and down (vertically) based on the topography of the guitar or guitar part being printed. In one aspect, a topography map corresponding to the guitar or part may be used to control the vertical position of the nozzles. In another aspect, a distance measurement system may be capable of measuring a distance to a surface of the guitar, and the vertical position of the ink-jet nozzles may be controlled based on the measured distance. In either aspect, the vertical position may be controlled to maintain a substantially uniform distance from the nozzles to the surface of the guitar or part. By substantially uniform is meant more uniform than the topography of the surface of the guitar or part.

Alternatively, rather than having the ink-jet spray nozzles move, the guitar or guitar part may be moved. In one aspect, the carrier may have capability to reposition the guitar or guitar part relative to the ink-jet spray nozzles. For example, the carrier may have capability to tilt, rock, expand, collapse, or the like. The capability may be manual, for example by an operator, or autonomous by the apparatus.

In still another embodiment of the invention, the volume of ink composition for a dot or drop, or the size of the dot or drop of ink, or both, may optionally be controlled based on a distance from the ink-jet printhead to the surface of the guitar. In one aspect, these aspects may be controlled based on a topography map or other data file corresponding to the particular topography of the guitar or part.

Some guitar manufacturers typically glue the neck of the guitar to the body of the guitar prior to applying polymeric or lacquer coatings to the guitar. Often, the top of the neck may sit higher than the top of the body of the guitar, like a ledge. In one embodiment of the invention, when applying a decoration, a guitar decorating apparatus may use guitar data, such as guitar shape data, to alter a print path based on a position of a neck. For example, the guitar decorating apparatus may stop printing prior to a printhead moving over the top or ledge of the neck. In one aspect, this may be done by software within the apparatus based on the current position of the printheads and the guitar data.

Once the decoration has been applied, a topcoat may be applied to the guitar. Suitable topcoats include, but are not limited to, polyurethane, polyester, polyacrylic, and lacquer coatings. An example is POLANE® High Solids Clear Topcoat polyurethane coating, available from The Sherwin-Williams Company, of Cleveland, Ohio. Another example is SHER-WOOD® CAB-Acrylic Lacquer from The Sherwin-Williams Company. Yet another example is Lawrence McFadden™ solvent-based nitrocellulose lacquer, available from The Lawrence-McFadden Company, of Philadelphia, Pa. If desired, multiple coats may be used. Then, the topcoat may be buffed to a shine.

In one or more embodiments, a guitar, such as a guitar video game controller, may include a decoration and a light, such as an electroluminescent lamp or light emitting capacitor (LEC) or electroluminescent phosphors, to illuminate or transmit light through the decoration. In one or more embodiments, the decoration may be a UV printed decoration as described elsewhere herein. For example, the decoration may include a multi-colored dot matrix representation of a digital image that includes dots having crosslinked inks. Such a decoration may be formed as described elsewhere herein. Alternatively, in one or more embodiments, the decoration may be formed by other approaches besides UV printing. For example, the decoration may be formed by other printing processes, such as, for example, silkscreen printing, ink jet printing, etc.

An electroluminescent light source, also known as a Light Emitting Capacitor (LEC), may produce light when phosphor crystals are excited by being exposed to electric current. Electroluminescent (EL) panels and strips can be found as backlighting for LCDs in pagers, cell phones, watches, and control panels as well as strip lighting for egress, decor architecture, broadcast sets, and much more. Electroluminescent phosphors may emit light when placed in a field of alternating current. EL Lamps may use either encapsulated or un-encapsulated phosphors Further details of electroluminescent lamps, if desired, are available in the following U.S. Pat. Nos.: 5,156,885, 5,418,062, 5,439,705, 5,593,782, 5,908,698, 6,445,128, and 6,528,943. All of the aforementioned patents are hereby incorporated herein by this reference.

Suitable electroluminescent lamps are commercially available from a number of sources. One source is Rogers Corporation of Rogers, Conn., which makes DUREL® electroluminescent (EL) lamps and integrated circuit (IC) drivers. Another source is E-Lite Technologies, Inc, of Trumbull, Conn., which makes FLATLITE® brand electroluminescent lights. Yet another source is Safe Lites, LLC, of Eden Prairie, Minn., which makes GlowSkin® Active Illumination Systems.

In one or more embodiments, the decoration or UV printing may be applied directly on and radiation cured on a surface of the electroluminescent lamp or other light. The UV printing may be performed substantially as previously described, although often simpler since the electroluminescent lamp may be a thin sheet of flat material and the carriers or three-dimensional aspects discussed above may optionally be simplified. If desired, a white or other mask may optionally be printed or otherwise applied first. The electroluminescent lamp may then be adhered with an adhesive or otherwise applied or coupled with the body of the guitar either before or after the decoration has been applied.

As another option, in one or more embodiments, the decoration or UV printing may be applied and radiation cured on a surface of a thin transparent or at least partially transparent (e.g., a translucent white sheet of polymeric material) material, such as a thin sheet of vinyl or another polymeric material. In one aspect, the thin sheet is a white or substantially white translucent or partially transparent material. The thin sheet or other thin transparent material may then be adhered or otherwise coupled on or over the electroluminescent lamp or other light. The electroluminescent lamp may be adhered to the guitar either before or after the decoration on the thin sheet is adhered to the electroluminescent lamp. This approach may offer the advantage that the thin sheet may be less expensive than the electroluminescent lamp and in cases may help to avoid ruining an electroluminescent lamp if the decoration is ruined or applied badly or incorrectly.

In one or more embodiments, the electroluminescent lamp or the thin sheet or other thin transparent material on which the UV printing is performed be sized to cover at least a majority or in some cases substantially all of a front surface of a body of the guitar. In one or more embodiments, the surface may be shaped substantially like at least a majority or in some cases substantially all of the front surface of the body of the guitar. Alternatively, they may be cut to have these sizes or shapes.

In one or more embodiments, a clear resin, such as a "dome label", may optionally be dispensed or otherwise applied over the decoration on the thin transparent sheet either before or after the decoration is applied to the electroluminescent lamp and/or the body of the guitar. In one or more embodiments, the dome label may include a clear transparent durable material such as vinyl, acrylic, urethane, or the like, that is about 2 mm thick. The dome label may have various hardness. In one particular embodiment, the dome label may include a dome label formed by a Demak® dispensing systems commercially available from Demak America, Inc. of Totowa, N.J., in which a protective clear resin coating is dispensed onto the decoration to provide a three-dimensional thickness. Advantageously, the dome label may provide a glossy look that may resemble the glossy look provided by several coats of urethane or acrylic clear coat traditionally applied to a traditional stringed musical instrument guitar. The dome label may also help to protect the image.

A detailed particular example method, according to an embodiment of the invention, may include UV printing a decoration on a thin translucent white sheet of vinyl or another polymeric material. Then the thin sheet having the decoration may be adhered, laminated, or otherwise coupled on an electroluminescent lamp. Then a dome label may be applied over or otherwise coupled over the decoration after it has been applied to the electroluminescent lamp. Then the electroluminescent lamp having the decoration may be adhered or otherwise coupled with the body of a guitar.

During use, the electroluminescent lamp or other light may transmit light through the decoration, which may be partially tanslucent, which may light up the decoration or make it appear to glow or radiate light. Advantageously, this may help to improve the appearance or aesthetics of the decoration. Advantageously, this may help the decoration to be more easily viewed in a dark environment, such as, for example, a bar, nightclub, or the like. The decoration, which in some cases may be an advertisement, may be more easily seen. While this may offer advantages for stringed musical instruments, it is thought that this may be particularly advantageous for a guitar video game controller when it is played at a bar or nightclub in front of other people for promotional purposes to promote an advertisement in the decoration illuminated by the light or lamp.

In one or more embodiments, some or most of the electronics or circuits to operate and/or power the electroluminescent lamp may be included within a box (e.g., "Showcase") that also houses or includes electronics or circuits to operate and/or power a guitar video game controller as in the popular Guitar Hero video game. A line from the box or housing may run from the box or housing to the guitar and may provide electrical signals to the electroluminescent lamp. The electroluminescent lamp may have a conductive carbon backing, or other conductors on the backside thereof, to provide electricity to the electroluminescent material.

In the description above, for the purposes of explanation, numerous specific details have been set forth in order to provide a thorough understanding of the embodiments of the invention. It will be apparent, however, to one skilled in the art, that other embodiments may be practiced without some of these specific details. In other instances, well-known structures, devices, and techniques have been shown in block diagram form or without detail in order not to obscure the understanding of this description.

Many of the methods are described in their most basic form, but operations may be added to or deleted from the methods. For example, in one embodiment of the invention, an old or used conventionally manufactured guitar may be decorated. In one aspect, the decoration may be applied on the top surface of the guitar. In another aspect, one or more coatings or layers of the guitar may be stripped or otherwise removed and then zero or more coatings and a decoration may be applied as described elsewhere herein. It will be apparent to those skilled in the art that many further modifications and adaptations may be made. The particular embodiments are not provided to limit the invention but to illustrate it. While the invention has been described in terms of several embodiments, those skilled in the art will recognize that the invention is not limited to the embodiments described, but may be practiced with modification and alteration within the spirit and scope of the appended claims. The description is thus to be regarded as illustrative instead of limiting. The scope of the invention is not to be determined by the specific examples provided above but only by the claims below.

It should also be appreciated that reference throughout this specification to "one embodiment" or "an embodiment" means that a particular feature may be included in the practice of the invention. Similarly, it should be appreciated that in the foregoing description of exemplary embodiments of the invention, various features are sometimes grouped together in a single embodiment, Figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

In the claims, any element that does not explicitly state "means for" performing a specified function, or "step for" performing a specified function, is not to be interpreted as a "means" or "step" clause as specified in 35 U.S.C. Section 112, Paragraph 6. In particular, the use of "step of" in the claims herein is not intended to invoke the provisions of 35 U.S.C. Section 112, Paragraph 6.

What is claimed is:

1. An apparatus comprising:
   a guitar shaped video game controller having a body and a neck;
   a decoration over a front surface of the body of the guitar shaped video game controller, the decoration applied over at least a majority of the front surface of the body of the guitar shaped video game controller, the decoration including a multi-colored dot matrix representation, the multi-colored dot matrix representation having cross-linked inks;
   an electroluminescent light coupled with the body of the guitar shaped video game controller and disposed underneath a majority of the decoration, the electroluminescent light to transmit visible light through the decoration.

2. The apparatus of claim 1, further comprising a box and a line from the electroluminescent light to the box, the box including a circuit to operate the electroluminescent light and the box including a circuit to operate the guitar shaped video game controller.

3. The apparatus of claim 1, wherein the decoration comprises cured UV ink compositions.

4. The apparatus of claim 1, wherein the decoration has photographic quality and is over substantially all of the front surface.

5. The apparatus of claim 1, wherein the decoration comprises an advertisement.

6. The apparatus of claim 1, wherein the decoration is applied on one of the electroluminescent light and a sheet to be applied over the electroluminescent light.

7. An apparatus comprising: a guitar shaped video game controller having a body and a neck; a decoration over a front surface of the body of the guitar shaped video game controller; a light coupled with the front surface of the body of the guitar shaped video game controller, the light disposed underneath the decoration, the light to transmit visible light through the decoration; the device further comprising a box and a line from the light to the box, the box including a circuit to operate the light and the box including a circuit to operate the guitar shaped video game controller.

8. The apparatus of claim 7, wherein the decoration comprises a multi-colored dot matrix representation having cross-linked inks.

9. The apparatus of claim 7, wherein the decoration comprises cured UV ink compositions.

10. The apparatus of claim 7, wherein the light comprises at least one electroluminescent light.

11. The apparatus of claim 7, wherein the light comprises a thin sheet of material that emits light.

12. The apparatus of claim 7, wherein the decoration is over at least a majority of the front surface of the body, wherein the light comprises a sheet of an electroluminescent material under at least a majority of the decoration, and wherein the decoration is either applied directly on the sheet of the electroluminescent material or the decoration is applied on a sheet of material disposed between the decoration and the sheet of the electroluminescent material.

13. The apparatus of claim 7, wherein the decoration comprises an advertisement.

14. The apparatus of claim 7, wherein the decoration has photographic quality.

15. A method comprising:
applying an electroluminescent light over a majority of a front face of a body of a guitar shaped video game controller;
applying a protective clear resin coating over a decoration that is over the electroluminescent light so that the electroluminescent light is operable to transmit light through the decoration, the decoration over a majority of the front face of the body of the guitar shaped video game controller, the decoration including a multi-colored photographic quality representation including cross-linked inks.

16. The method of claim 15, further comprising forming the decoration including:
spraying radiation-sensitive ink compositions with different colors; and
exposing the radiation-sensitive ink compositions to radiation.

17. The method of claim 16, wherein spaying comprises spraying the compositions on one of a surface of the electroluminescent light and a sheet that is to be applied over the electroluminescent light.

* * * * *